US011518124B2

(12) United States Patent
Chang

(10) Patent No.: US 11,518,124 B2
(45) Date of Patent: Dec. 6, 2022

(54) METHOD AND APPARATUS FOR MANUFACTURING A WRINKLED NET

(71) Applicant: OLIVETTE INDUSTRIES CO., LTD., Changhua County (TW)

(72) Inventor: Che-Yuan Chang, Yuanlin (TW)

(73) Assignee: OLIVETTE INDUSTRIES, CO., LTD., Changhua County (TW)

( * ) Notice: Subject to any disclaimer, the term of this patent is extended or adjusted under 35 U.S.C. 154(b) by 829 days.

(21) Appl. No.: 16/438,139

(22) Filed: Jun. 11, 2019

(65) Prior Publication Data

US 2020/0359850 A1   Nov. 19, 2020

(30) Foreign Application Priority Data

May 17, 2019   (TW) .................................. 108117156

(51) Int. Cl.
*B29D 28/00* (2006.01)
*A47K 7/02* (2006.01)

(52) U.S. Cl.
CPC ................ *B29D 28/00* (2013.01); *A47K 7/02* (2013.01)

(58) Field of Classification Search
CPC .......... A47K 7/02; D02G 1/122; B29C 53/22; B29C 55/18; B29C 53/2365
See application file for complete search history.

(56) References Cited

U.S. PATENT DOCUMENTS

| | | | | |
|---|---|---|---|---|
| 3,305,897 A | * | 2/1967 | Meibohm | D02G 1/12 28/267 |
| 3,859,695 A | * | 1/1975 | Erickson | D02G 1/125 28/267 |
| 4,162,564 A | * | 7/1979 | Stanley | D02G 1/122 28/255 |
| 5,916,408 A | * | 6/1999 | Chen | A47K 7/02 156/308.4 |
| 7,097,803 B2 | * | 8/2006 | Chang | A47K 7/022 264/285 |

* cited by examiner

*Primary Examiner* — Carib A Oquendo
(74) *Attorney, Agent, or Firm* — Muncy, Geissler, Olds & Lowe, P.C.

(57) ABSTRACT

A method for manufacturing a wrinkled net includes the step of guiding a net body between two opposed first rollers where the first rollers are rotated to primarily wrinkle the net body, the step of guiding the net body in between two second rollers where the second rollers are rotated to pressurize the net body and heat is generated by friction between the second rollers and the net body to soften the net body, the step of collecting the softened net body in a container where portions of the softened net body are squeezed against one another, and the step of releasing the wrinkled net body from the container after a predetermined period of time in which the portions of the softened the net body are squeezed against one another in the container.

9 Claims, 5 Drawing Sheets

METHOD AND APPARATUS FOR MANUFACTURING A WRINKLED NET

BACKGROUND OF THE INVENTION

1. Field of the Invention

The present invention relates to bath cleaning technology, in particular to a method for manufacturing a wrinkled net and an apparatus for the implementation of the method.

2. Description of the Related Art

General bath cleaning products, such as bath balls or bathing gloves, are mostly made of extruded plastic mesh. The mesh formed by the plastic mesh body allows the detergent adhered thereto to rapidly generate foam, thereby allowing the user to easily wash the body. However, a plastic net product produced in this way has a surface roughness which is not high. If the user wants to brush a dirty area of the body, such as the elbow or the sole, the user must work harder or brush the dirty area of the body repeatedly. There are still some inconveniences.

In order to solve the above problems, please refer to FIG. 1, which is a conventional apparatus for manufacturing a wrinkled mesh. This conventional apparatus uses a heating unit 2 to heat a net body 1 to soften it, and then uses two rollers 3 to roll the softened net body 1, and then feeds the rolled portion of the softened net body 1 into a container 4. The rolled portion of the softened net body 1 gathered in the container 4 is then squeezed to exhibit an irregularly wrinkled state, and the container 4 is simultaneously heated by another heating device 5 to maintain a certain temperature, and finally the wrinkled net body 1 is released from the container 4 to complete the manufacturing of a wrinkled net.

However, the aforementioned conventional apparatus uses the heating unit 2 to heat the net body 1, and thus it is necessary to wait for the heating time to perform the next step, which causes a drop in production efficiency. Further, the arrangement of the heating unit 2 and the heating device 5 also affects the overall space configuration and leads to an increase in equipment cost.

SUMMARY OF THE INVENTION

The present invention has been accomplished under the circumstances in view. It is the main object of the present invention to provide a method for manufacturing a wrinkled net, which can improve production efficiency and save equipment cost, and can produce a wrinkled net with better wrinkle effect.

To achieve this and other objects of the present invention, a method for manufacturing a wrinkled net includes the step of guiding a net body between two opposed first rollers where the first rollers are rotated to primarily wrinkle the net body, the step of guiding the net body in between two second rollers where the second rollers are rotated to pressurize the net body and heat is generated by friction between the second rollers and the net body to soften the net body, the step of collecting the softened net body in a container where portions of the softened net body are squeezed against one another, and the step of releasing the wrinkled net body from the container after a predetermined period of time in which the portions of the softened the net body are squeezed against one another in the container.

As can be seen from the above, the manufacturing method of the present invention softens the net body by means of friction heating, and prolongs the time during which the net body is pressed and deformed in the container, thereby increasing the degree of squeezing of the net body in the container and making the surface wrinkle effect better. In addition, the manufacturing method of the present invention omits the step of heating the net body using a heating unit, thereby saving waiting time for heating and achieving the purpose of improving production efficiency and reducing the cost of the apparatus.

It is another object of the present invention to provide an apparatus for the implementation of the method for manufacturing a wrinkle net, which comprises a container, two opposed second rollers and two opposed first rollers. The container is used to accommodate a net body to for processing, having an inlet and an outlet. The two second rollers are disposed adjacent to the inlet of the container for pressurizing the net body and softening the net body by friction heating. After having been pressed by the second rollers, the net body is transferred toward the container. The two first rollers are located on the same side of the container as the two second rollers and maintain a distance between the two second rollers and are used to primarily wrinkle the net body. After having been primarily wrinkled by the first rollers, the net body is transferred to the second rollers.

Other advantages and features of the present invention will be fully understood by reference to the following specification in junction with the accompanying drawings, in which like reference signs denote like components of structure.

DETAILED DESCRIPTION OF THE INVENTION

Figure 1:
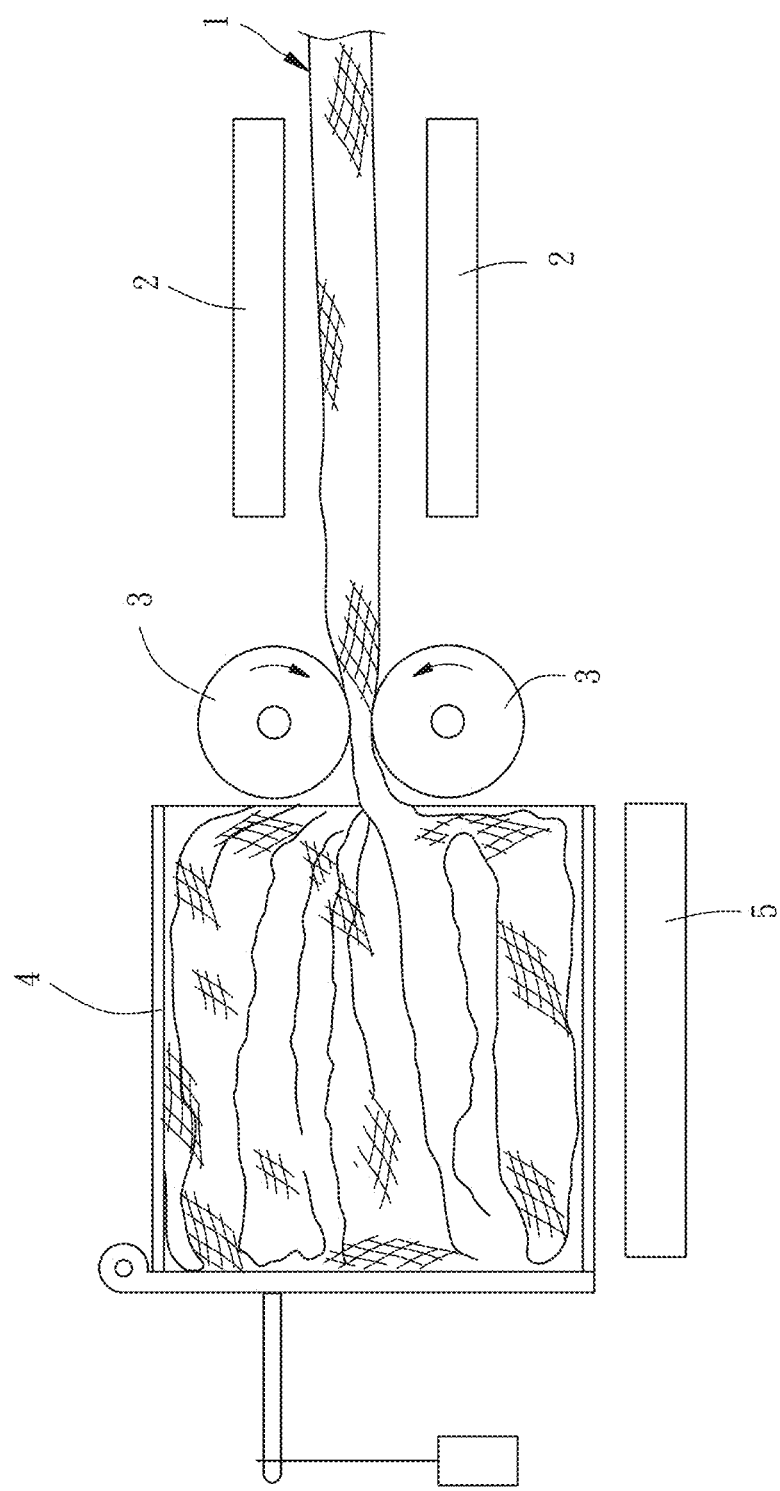
FIG. 1 is a schematic drawing illustrating a conventional apparatus for manufacturing a wrinkled net.

The Applicant first describes here, in the entire specification, including the preferred embodiment described below and the claims of the patent application, the nouns relating to directionality are based on the directions in the drawings. In the following preferred embodiment and the drawings, the same reference numerals are used to refer to the same or similar elements or structural features thereof.

Figure 2:
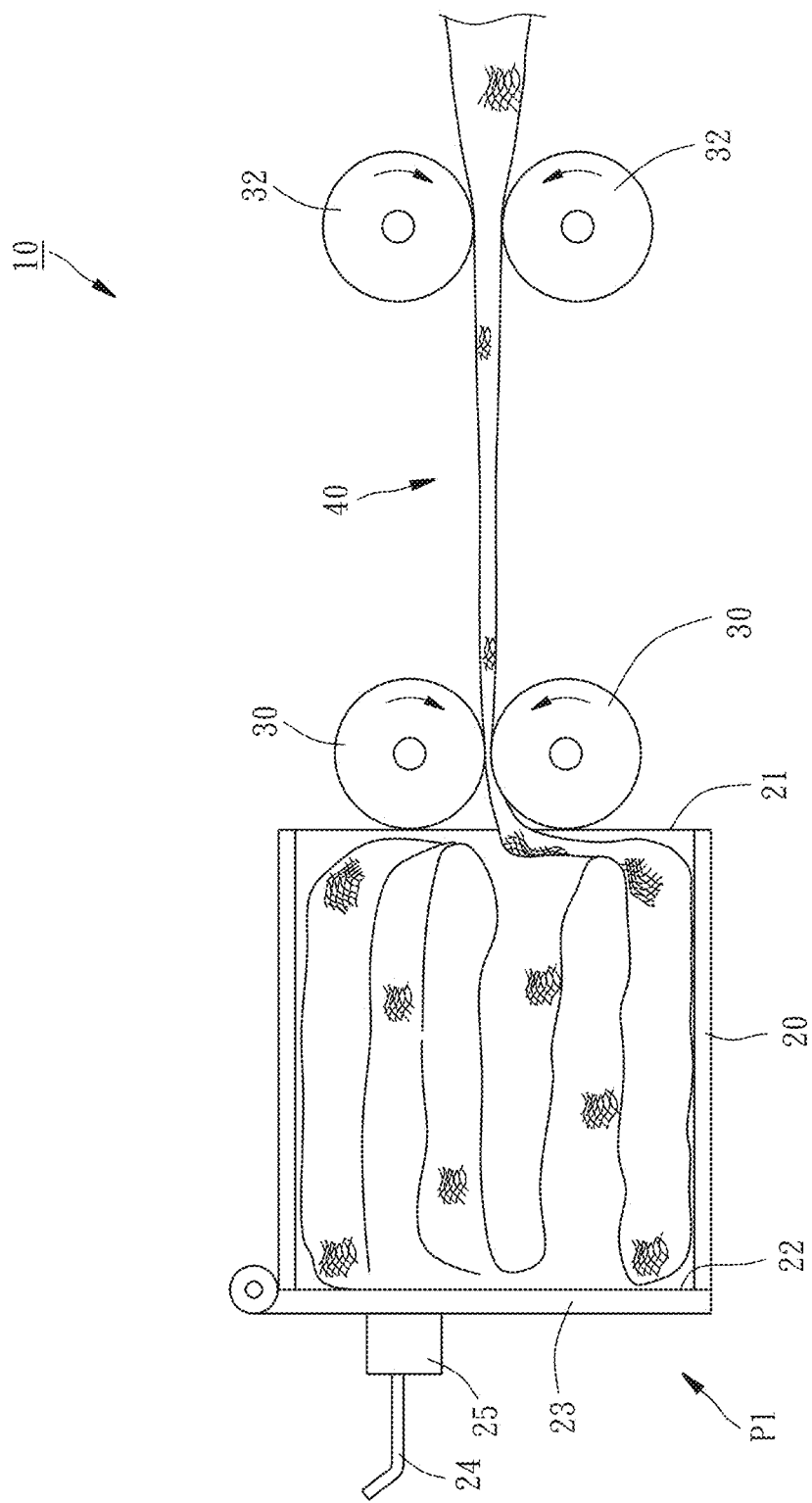
FIG. 2 is a schematic structural view of an apparatus for manufacturing a wrinkled net in accordance with the present invention, illustrating the cover plate in the closed position.
Figure 3:
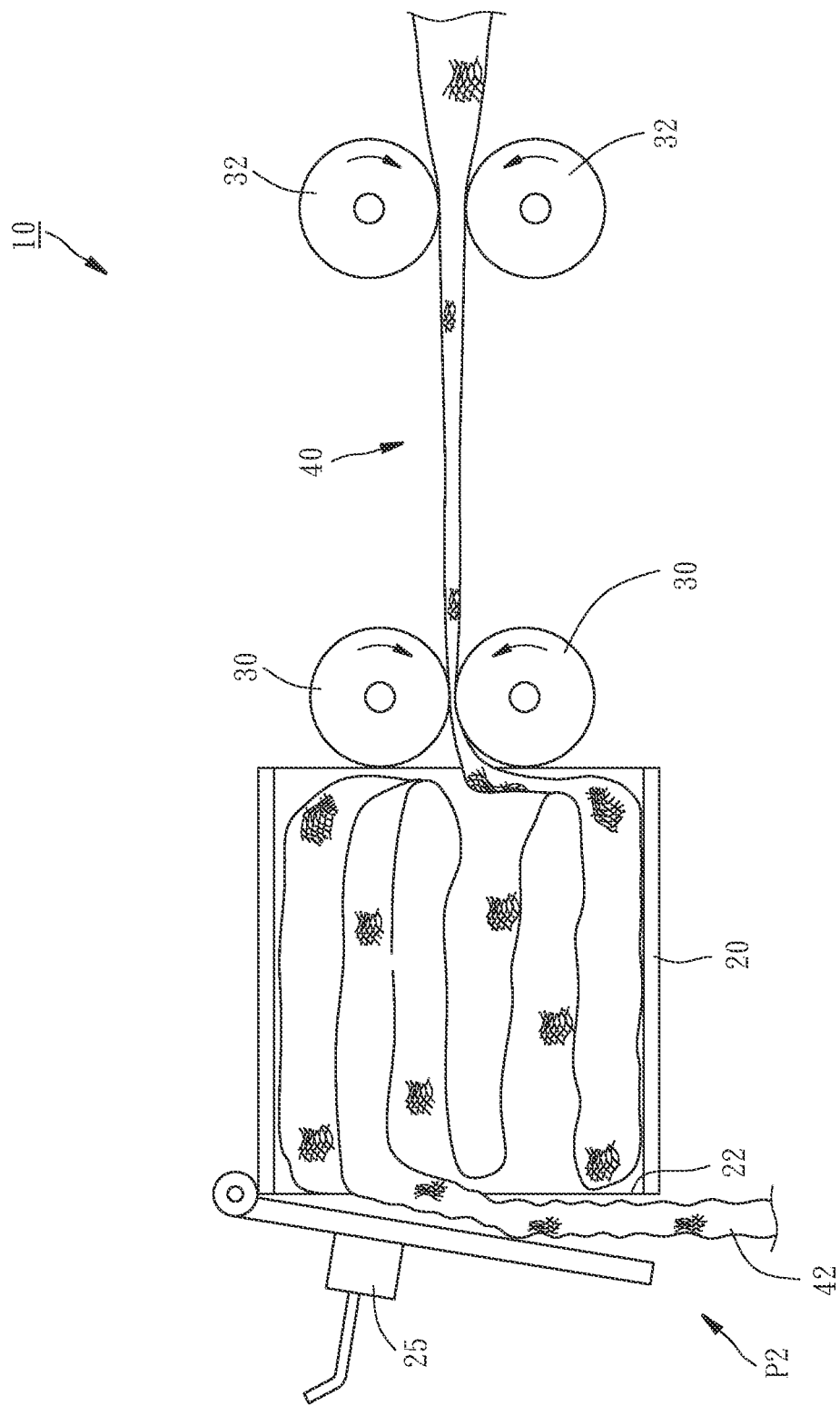
FIG. 3 is similar to FIG. 2, showing the cover plate in the open position.

Referring to FIGS. 2 and 3, the apparatus, referenced by 10, comprises a container 20, two opposed second rollers 30 spaced apart from each other, two opposed first rollers 32 spaced apart from each other, a cover plate 23 and a weight 25.

The container 20 has an inlet 21 and an outlet 22.

The two second rollers 30 are disposed adjacent to the inlet 21 of the container 20. The two first rollers 32 are located on the same side of the container 20 as the two second rollers 30 and maintain a distance between the two second rollers 30. In addition, the interval between the two second rollers 30 is less than the interval between the two first rollers 32, and the rotational speed of the two second rollers 30 is higher than the rotational speed of the two first rollers 32.

The cover plate 23 is pivotally connected to the container 20 and biasable between a closed position P1 (see FIG. 2) where the cover plate 23 closes the outlet 22 and an open position P2 (see FIG. 3) where the cover plate 23 is opened from the outlet 22.

The weight 25 is hung on a cantilever rod 24, and one end of the cantilever rod 24 is connected to the outer side of the cover plate 25, so that the cover plate 23 is held in the closed position P1 by the torque generated by the weight 25.

Figure 4:
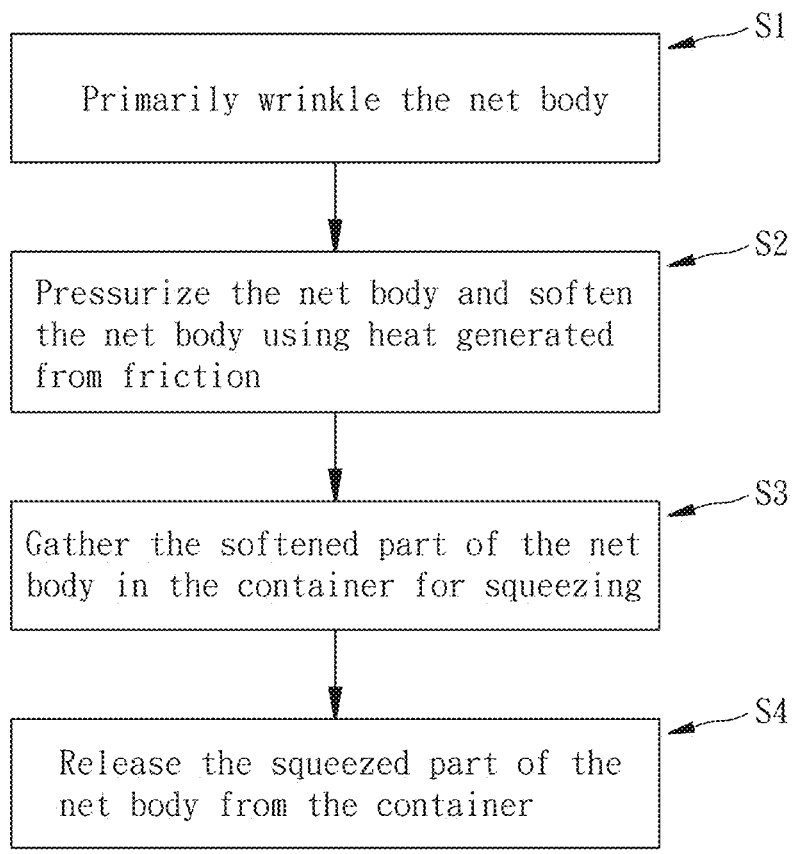
FIG. 4 is a flow chart of a method for manufacturing a wrinkled net in accordance with the present invention.

Referring to FIG. 4, a method for manufacturing a wrinkle net using the aforesaid apparatus 10 comprises the steps as follows:

Step a): As shown in FIG. 4, 51, a net body 40 is guided between the two first rollers 32, so that the two first rollers 32 pressurize the net body 40 during the continuous rotation to allow the surface of the net body 40 to be wrinkled, and then the net body 40 is transported toward the two second rollers 30.

Step b): As shown in FIG. 4, S2, the net body 40 is guided between the two second rollers 30. Since the interval between the two second rollers 30 is smaller than the interval between the two first rollers 32, and the rotational speed of the two second rollers 30 is higher than the rotational speed of the two first rollers 32, the two second rollers 30 pressurize the net body 40 with greater pressure on the one hand during the continuous rotation to deform the net body 40, making the surface wrinkles of the net body 40 more visible, on the other hand, the heat generated by the friction with the net body 40 can soften the net body 40. The deformed softened portion of the net body 40 is transported to the container 20.

Step c): As shown in FIG. 4, S3, by the continuous rotation of the two second rollers 30, the deformed softened portion of the net body 40 is continuously pushed into the container 20 via the inlet 21 of the container 20. When the part of the net body 40 gathered in the container 20 is getting larger, the gathered part will be squeezed in the container 20 to exhibit an irregular deformation state.

Step d): As shown in FIG. 4, S4, after the net body 40 is continuously squeezed for a period of time in the container 20, more specifically, when the net body 40 is squeezed in the container 20, the portions which are pressed against each other are forced against the cover plate 23. When the thrust overcomes the holding force of the weight 25 applied to the cover plate 23, the cover plate 23 can be pushed to the open position P2 as shown in FIG. 3. The processed part of the net body 40 is then released from the outlet 22 of the container 20. The net body 40 that is released from the outlet 22 of the container 20 has a wrinkled surface, thus completing the manufacture of a wrinkled net 42.

Figure 5:
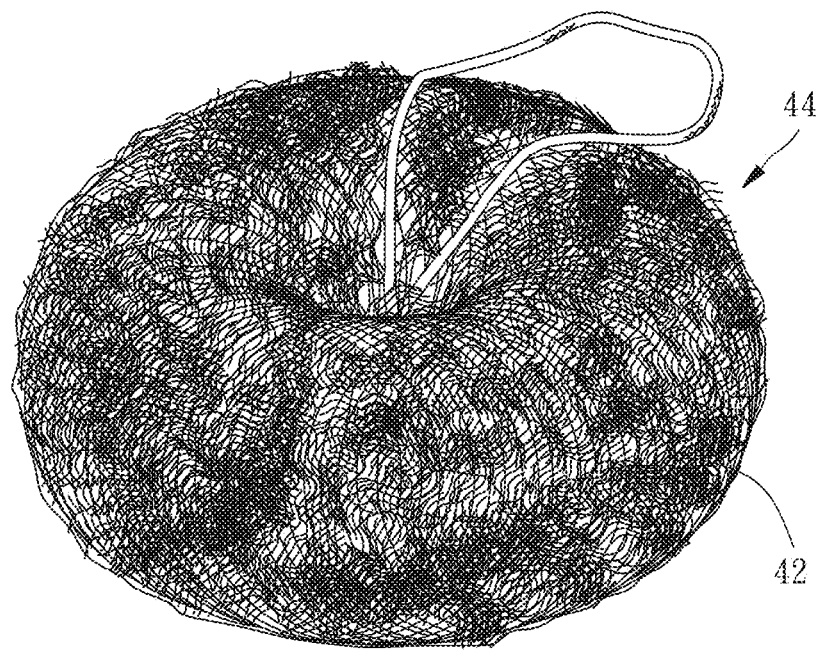
FIG. 5 is a schematic drawing showing the outer appearance of a bathing ball made of a wrinkled net in accordance with the present invention.
Figure 6:
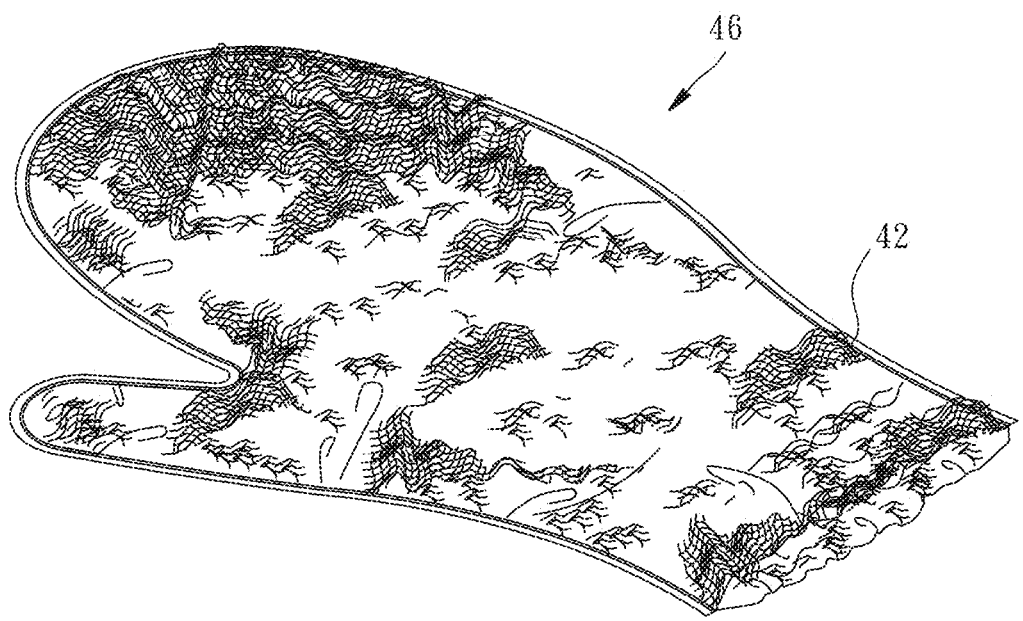
FIG. 6 is a schematic drawing showing the outer appearance of a bathing glove made of a wrinkled net in accordance with the present invention.

As can be seen from the above, the manufacturing method of the present invention softens the net body 40 by means of friction heating, and prolongs the time during which the net body 40 is pressed and deformed in the container 20, thereby increasing the degree of squeezing of the net body 40 in the container 20 and making the surface wrinkle effect better. Therefore, the bathing products made by the net body 40 (such as the bathing ball 44 shown in FIG. 5 or the bathing glove 46 shown in FIG. 6) can provide better cleaning effect. In addition, the manufacturing method of the present invention omits the step of heating the net body 40 using a heating unit, thereby saving waiting time for heating and achieving the purpose of improving production efficiency and reducing the cost of the apparatus.

What is claimed is:

1. A method for manufacturing a wrinkled net, comprising the steps of:
   a) guiding a net body between two opposed first rollers where said first rollers are rotated to primarily wrinkle said net body;
   b) guiding said net body in between two second rollers where said second rollers are rotated to pressurize said net body and heat is generated by friction between said second rollers and said net body to soften said net body without using a heating element;
   c) collecting the softened said net body in a container where portions of the softened said net body are squeezed against one another; and
   d) releasing the wrinkled said net body from said container after a predetermined period of time in which the said portions of the softened said net body are squeezed against one another in said container.

2. The method as claimed in claim 1, wherein said net body is deformed under the pressure of said two second rollers such that the wrinkles formed in the surface of said net body in step b) are more pronounced than in step a).

3. The method as claimed in claim 1, wherein an interval between said two second rollers is less than an interval between said two first rollers.

4. The method as claimed in claim 1, wherein a rotational speed of said two second rollers is higher than a rotational speed of said two first rollers.

5. An apparatus for the implementation of the method for manufacturing a wrinkled net as claimed in claim 1, comprising:
   a container comprising an inlet and an outlet;
   two opposed second rollers disposed adjacent to said inlet of said container and spaced apart from each other by a predetermined interval; and
   two opposed first rollers located on the same side of said container as said two second rollers and maintain a distance between said two second rollers, said two first rollers being spaced apart from each other by a predetermined interval.

6. The apparatus as claimed in claim 5, wherein the interval between said two second rollers is less than the interval between said two first rollers.

7. The apparatus as claimed in claim 5, wherein a rotational speed of said two second rollers is higher than a rotational speed of said two first rollers.

8. The apparatus as claimed in claim 5, further comprising a cover plate pivotally connected to said container and biasable between a closed position where said cover plate closes said outlet and an open position where said cover plate is opened from said outlet.

9. The apparatus as claimed in claim 5, further comprising a weight mounted to said cover plate and used to hold said cover plate in said closed position.

* * * * *